Jan. 12, 1932.  J. GARVEY  1,840,578
METHOD AND APPARATUS FOR DIVIDING DOUGH INTO UNIFORM WEIGHTS
Original Filed May 22, 1929    3 Sheets-Sheet 1

INVENTOR
JAMES GARVEY.
BY
Lyon & Lyon ATTORNEY

Jan. 12, 1932.  J. GARVEY  1,840,578

METHOD AND APPARATUS FOR DIVIDING DOUGH INTO UNIFORM WEIGHTS

Original Filed May 22, 1929   3 Sheets-Sheet 2

INVENTOR.
JAMES GARVEY.
BY
ATTORNEYS.

INVENTOR.
JAMES GARVEY.
BY Lyon & Lyon
ATTORNEYS.

Patented Jan. 12, 1932

1,840,578

UNITED STATES PATENT OFFICE

JAMES GARVEY, OF LOS ANGELES, CALIFORNIA

METHOD AND APPARATUS FOR DIVIDING DOUGH INTO UNIFORM WEIGHTS

Application filed May 22, 1929, Serial No. 365,113. Renewed August 29, 1931.

This invention relates to a method and apparatus for dividing dough and like materials into particles of uniform weight.

Heretofore it has been difficult with all doughs, and impossible with some doughs, to mechanically sub-divide dough into particles of uniform weight. Dough consists of a plastic mass containing a considerable amount of mechanically included gas. Depending on the pressure and conditions of the dough, particles of uniform volume of dough obtained in ordinary manners may vary considerably in weight. The result is that rolls or loaves of bread made from such particles will vary considerably in size and weight.

By subjecting the dough to heavy compression, as by a plunger, it has been possible to fill compartments of uniform size with dough and make fairly uniform weights. This operation, however, has the disadvantage that it so compresses the dough that in order to properly make bread, or other products therefrom, it is necessary to subject the particles produced to a heating or steaming or "proofing" operation to revive the dough. Many doughs, particularly those forming hearth baked breads, are so delicate that these operations are ruinous to the dough. Accordingly, heretofore this art has had to rely upon hand operation for sub-dividing dough in many cases.

An object of the present invention is to provide a process and apparatus for treating dough by which the dough may be reduced to a uniform apparent density and the larger gas cells of the dough ruptured without the process or apparatus requiring an excessive compressing or crushing of the dough.

Another object of the present invention is to provide a means by which air may be introduced into a dough mass and uniformly distributed thereinto.

Another object of the present invention is to provide a method and apparatus for sub-dividing dough into particles of uniform weight without compressing the dough to such an extent that it is necessary to heat or steam or "proof" the same to re-enliven the dough.

By the process and apparatus of the present invention dough of various kinds, including those tender doughs which heretofore have always had to be sub-divided by hand, can be mechanically sub-divided into particles of uniform size so that the whole operation of manipulating the dough and dividing the same and substantially the entire bread manufacturing operation can be performed by machinery rather than by hand. In this way, there is a marked saving in the cost of manufacturing bread, both on account of saving in labor and on account of saving of materials.

In accordance with the present invention it has been discovered that when dough is placed in a centrifugal chamber and subjected to centrifugal force, the large gas cells of the fermented gas in the dough are ruptured and the gas partially worked towards the center of the mass and the remainder of the gas distributed uniformly through the dough. This produces a dough of better texture for baking purposes. It has also been discovered that by introducing air in the periphery of a centrifuging chamber filled with dough, the air enters the dough and becomes uniformly distributed therethrough, displacing part of the fermenting gases. The displacement of a portion of the gases from the fermenting process by fresh air is recognized as having beneficial effects upon the dough.

In accordance with the present invention it has been discovered that when dough is placed in a centrifugal chamber having outlets or compartments of uniform volume and subjecting to centrifugal force within reasonable limits, the dough may be caused to enter and fill the compartments while the air mechanically included with the dough will work towards the center of the centrifugal machine so that, as a result, each uniform volume of dough formed in this manner will weigh a standard amount and this can be effected without excessively compressing the dough. Thus, by the method and apparatus of the present invention, dough may be divided into uniform particles which require no re-enlivening in order to make satisfactory bread and, moreover, the process and apparatus is adapted for use on delicate doughs which heretofore have required to be sub-divided by hand.

The present invention also includes various features such as the provision of a continuous process and machine and the provision of a machine in which the weights of the dough may be changed as desired.

Various further objects, advantages and features of the present invention will be understood from the description of a preferred form or example of a process and apparatus for manufacturing dough in accordance with the present invention. For this purpose, there is hereafter described, with reference to the accompanying drawings, a preferred form or example of such a dough making machine and process.

Referring to the drawings, Figure 1 is an elevation mainly in vertical section of the preferred form of machine and apparatus.

Figure 1:
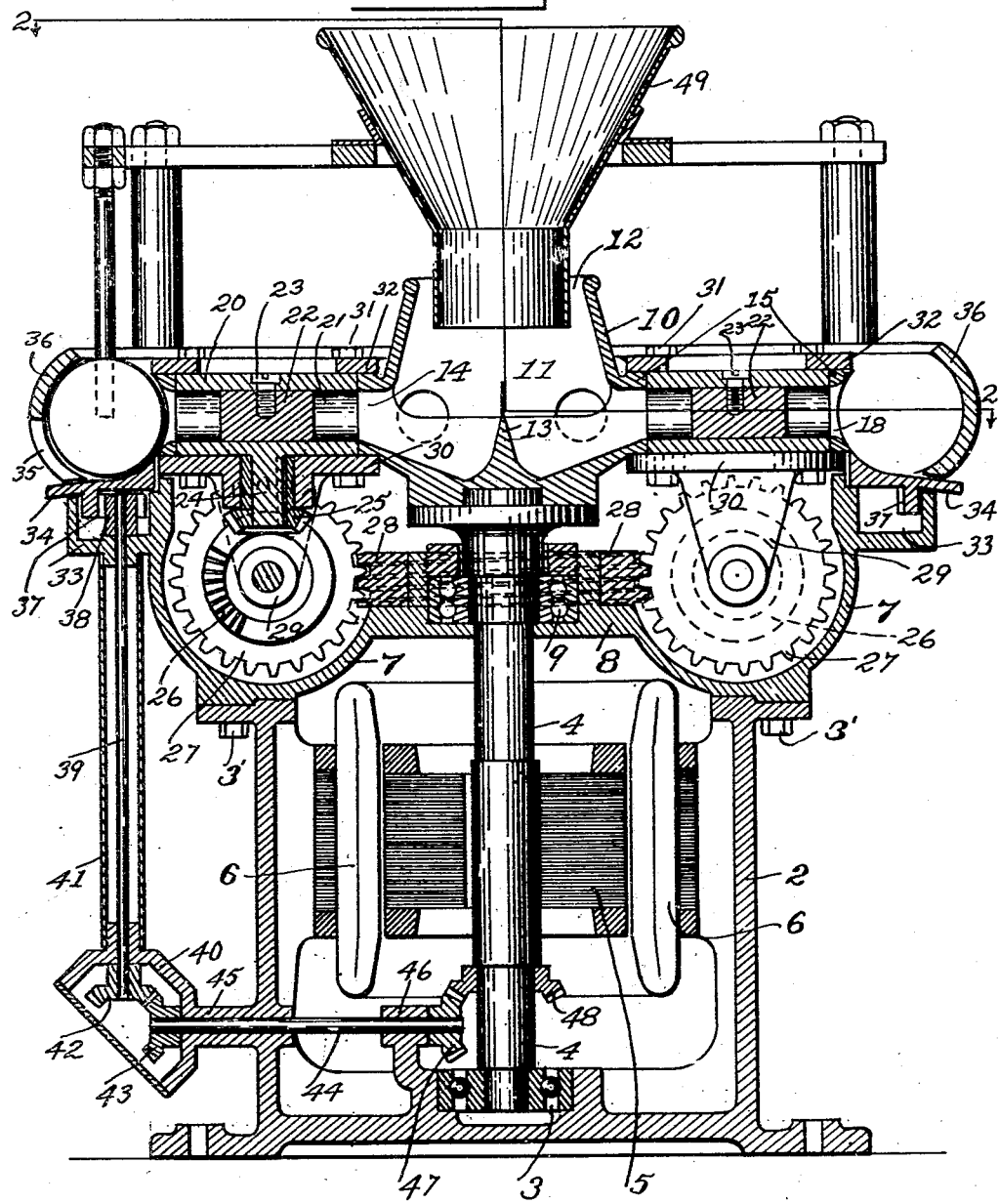

Referring to the drawings, the apparatus as illustrated, comprises a lower frame 2 which provides bearings 3 at its lower end for a vertical shaft 4. The vertical shaft 4 is rigid with the rotor 5 of an electric motor which has its field windings 6 secured to the frame 2. The electric motor formed of the rotor 5 and the field windings 6, constitutes but one form of a machine for driving the remaining parts of the machine or apparatus of this invention.

Figure 2:
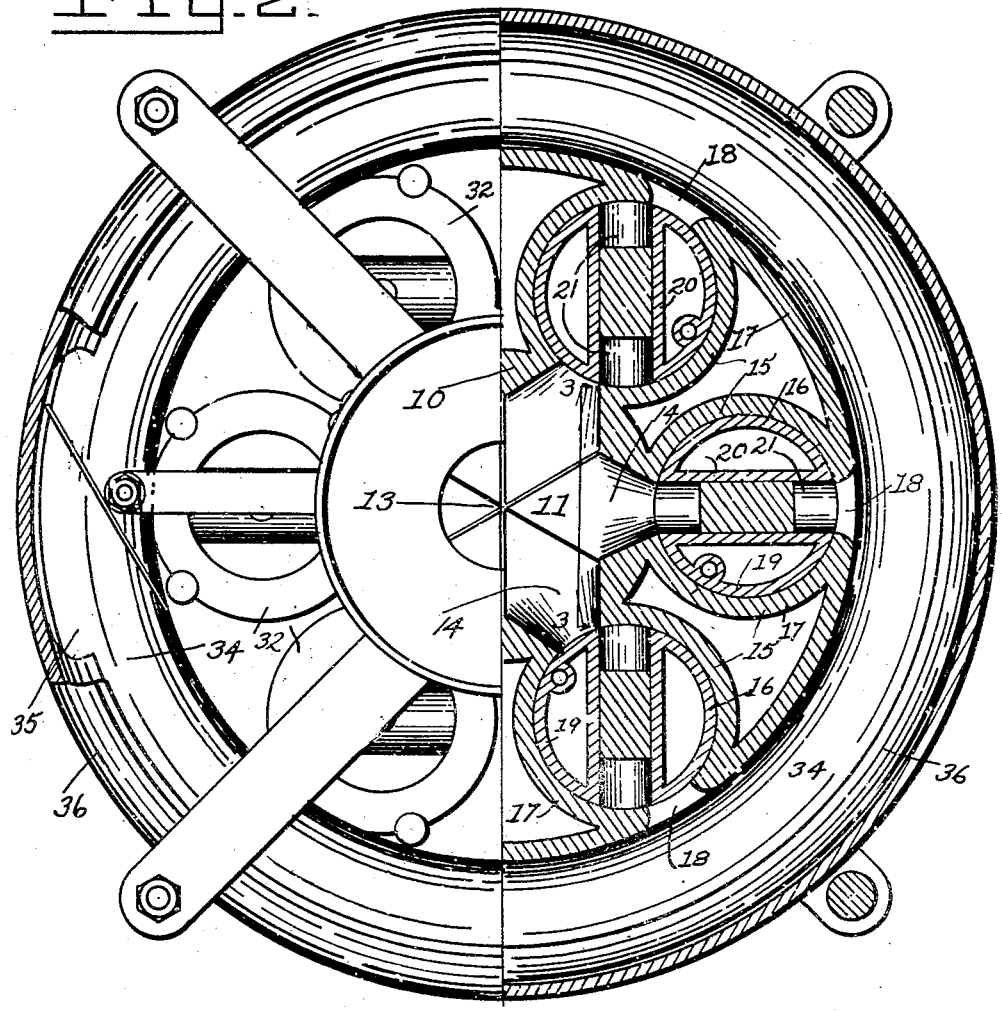
Figure 2 is a plan view and in quarter section as taken on the line 2—2 of Figure 1.
Figure 3:
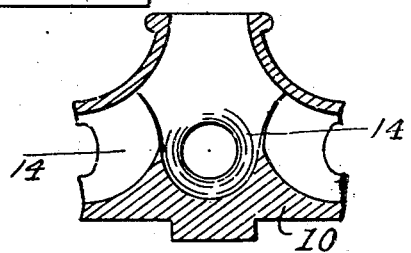
Figure 3 is a fragmentary section on the line 3—3 of Figure 2.

Secured to the lower frame 2 by suitable means such as bolts 3' is an upper frame member 7. Said upper frame member 7 has a center partition 8 which forms the support for upper bearings 9 of the shaft 4 and is rigid with a worm gear 28. The shaft 4 has attached to its upper end a centrifugal member 10 having a centrifuging chamber 11 which is open at its upper end, as indicated at 12, so that dough may be admitted continuously or intermittently in operation to the centrifuging chamber 11. The base of the chamber 11 is provided with a dividing cone 13 which contacts with dough dropped into the center of the opening 12 and distributes it towards the side walls of the centrifuging chamber 11. As better illustrated in Figures 2 and 3, the centrifuging chamber 11 has a number of outwardly contracting ways 14 terminating in discharge ports of which, in the particular machine shown, there are six in number.

The centrifugal member 10 provides at each outlet 14, from the centrifuging chamber 11, a cylindrical frame 15 for holding a dividing or measuring element 16. The several cylindrical frames 15 are shown as connected together by walls 17 at their outer ends, forming an outer cylindrical frame on the centrifugal member 10 which is provided with openings 18 radially aligned with openings 14 from the centrifuging chamber 11. In the cylindrical frames 15 are rotatably mounted the measuring elements or members 16 which are formed of an outer cylindrical frame 19 and inner partition 20 forming a diametric passage 21 adapted to register in one position with one of the outlets 14 of the centrifuging chamber 11 and one of the outlets 18 in the outer cylindrical frame 17. Within the passage 21 is disposed a block 22 which is preferably mounted in the center of the way 21 and is of less length than the diametric way so that it forms two horizontally disposed cups at opposite ends of the way 21, which cups are of equal size and constitute the measuring chambers of the apparatus. The block 22 is normally held in place by a set screw 23, see Figure 1.

When making different sized portions of dough, replaceable blocks 22 of different size may be provided. The measuring member 16 is shown as provided with a vertically depending neck or shaft section 24. This shaft 24 is keyed to a beveled gear 25 which is adapted to mesh with a mutilated gear 26. The mutilated gear 26 is rigid with a gear 27 which is shown as continuously engaging the worm gear 28 secured to the frame of the machine. The gears 27 and 26 have their shaft or axle carried by a bracket 29 depending from a plate 30 placed against the bottom of the cylindrical frames 15 of the centrifugal member 10 and secured by bolts 31 to an upper annular plate 32. The plates 30 and 32 operate to hold the measuring member 16 in place as well as supporting the brackets for the gears 26 and 27.

The upper frame member 7 is shown as curved to closely accommodate the gears 27 and operates also as a guard for this portion of the centrifuging machine. The frame 7 also is provided with an outwardly extending annular trough 33 in which is mounted a revolving conveyor 34, the purpose of which is to receive particles of dough measured and sub-divided by the centrifuge machine and discharge the same through an opening 35 in the upper outer guard 36 rigid with or integral with the upper frame 7.

The revolving conveyor 34 is an enlarged annular track, the axis of which is common with that of the shaft 4 and the conveyor 34 is provided with a depending, annular, internal gear 37 which extends into the trough 33, the outer surface of which forms a bearing or guide for the conveyor. The annular gear 37, in operation, engages a gear 38 on a vertical shaft 39 which extends down to an extension 40 of a lower frame which provides a lower bearing for the shaft 39. The shaft is shown as covered by a tube 41. The lower end of the shaft 39 is shown as provided with a bevel gear 42 engaging the bevel gear 43 on a horizontal shaft 44, journaled in the bearing 45 in the frame 2 and an inner frame bearing 46 in the frame 2. The shaft 44 is disposed radially in the machine and its inner end is provided with a bevel gear 47 which engages a bevel gear 48 on the main shaft 4.

49 indicates a hopper which may be used to guide or feed dough into the centrifuge chamber 11. This hopper, in practice, is ordinarily bolted to the ceiling of the room above the centrifuge machine and is fed directly from a mechanical dough mixer positioned in the upper room.

In operation of the machine thus described and in conducting the preferred process of treating, subdividing and measuring dough embodying this invention, the operations are as follows:

The dough, which is formed in any preferred or desired manner, is fed into the centrifuge chamber 11. This may be done either continuously or intermittently. Sufficient dough is fed into the machine so that the centrifuge chamber 11 has maintained therein a bulk supply of dough which more than covers the inner ends of the tapered outlets 14. The centrifuge chamber 11 is driven at a predetermined speed continually during operation and the dough falling into the centrifuge chamber 11 is by centrifugal force, forced against the outer side walls of the centrifuge chamber 11. Here, an important action in the present process is caused to take place. The dough which is fed into the machine contains a certain amount of air or gas of the fermenting operations and this gas may, in cases, be of different sizes in gas pockets or air cells throughout the dough. The apparent density of a definite volume of the dough will therefore vary, according to the air or gas content. When the dough is fed into the centrifuge chamber 11, it has been found that the centrifugal force forcing the material of dough toward the outer walls of the centrifuge chamber, causes the air and gas of the dough to work inwardly toward the center of the chamber. The resulting effect is that the larger air or gas cells are punctured and that portion of the dough occupying the outer position comes to a substantially definite apparent density which is dependent upon the speed of the centrifuge machine. By this means, it is possible to feed into the centrifuge chamber, a dough having different apparent densities and to draw from the centrifuge chamber a dough of constant apparent density.

Moreover, it is found that this can be accomplished without subjecting the dough to such high pressures as to kill or otherwise injure the dough.

A dough of constant density may thus be obtained from delicate doughs which cannot be successfully proofed or re-enlivened and in case doughs which are capable of being re-enlivened when excessively compressed, it eliminates the necessity of this operation.

During the centrifugal motion of the centrifuge chamber 11, the measuring elements or members 16 are passed through the following operations:

Considering the members first as positioned with their diametric passages in line with the openings 14 and 18 in the centrifuge frame 10. In this position, gear 25 connected with the measuring elements 15 is disconnected with the teeth of the mutilated gear 26 and the measuring elements remain in position to have one of their pockets filled with dough under the centrifugal force imparted to the dough in the centrifuge chamber 11. A number of ball catches 50 are provided for holding the measuring elements 16 in position during that portion of the operation that the gear teeth on the mutilated gear 28 are disengaged with those on the gear teeth 25. In this portion of the operation of the process of the apparatus, there is a definite volume of dough received in one of the measuring pockets or cups of the measuring member 16 and since the density of the dough is, by the centrifuging operation, brought to a predetermined value, the weight of dough which is filled in the pockets in each case is accurately the same.

When the pockets have been suitably filled, the teeth on the mutilating gear 26, which gear is turning due to engagement between gears 27 and 28, engage the gear 25 and revolve the measuring element one-half revolution, presenting the filled pockets of dough to the outlet 18 in the outer frame and presenting a second open pocket to be filled with dough from the centrifuge chamber 11. It is to be noted that at the time the pocket in the measuring member 16 is cut off from the bulk supply of materials, there is still imposed upon the dough in the pocket, pressure of other dough equal to that at which the pocket is filled. Therefore, the pressure of the dough at the time of closing the pocket from connection with the bulk supply of materials is the same as that at which the pocket was filled. This constitutes an important feature in insuring uniformity of weights. In the machines heretofore used for sub-dividing dough, the pressure of the dough entering the pockets is released or partially released at the time that the pocket is cut off from the supply of dough. This has resulted in an inaccuracy in the weight of dough which is retained in the pocket.

As the pocket filled with dough reaches the opening 18 in the centrifuge frame 10, the centrifugal force throws the measured quantity of dough from the pocket where it usually first strikes the guard 36. From the guard 36, the dough falls back onto the conveyor 34. It is then carried around by conveyor 34 to the opening 35 in the guard. Here there is provided a baffle 51, the function of which is to push the weights of dough on the conveyor 34 out of the opening 35.

The weights of dough emitted from the opening 35 may be picked up by any preferred or usual form of conveyor and automatically further processed.

Another feature of the present invention resides in the fact that each time one of the measuring pockets or chambers discharges a quantity of dough from the periphery of the machine the pocket then becomes filled with air. When the pocket is rotated to present itself with the port of the centrifuging chamber this air works into the dough, aerating the same, and becomes uniformly distributed through the dough. This increases the quality of the dough.

Figure 4:
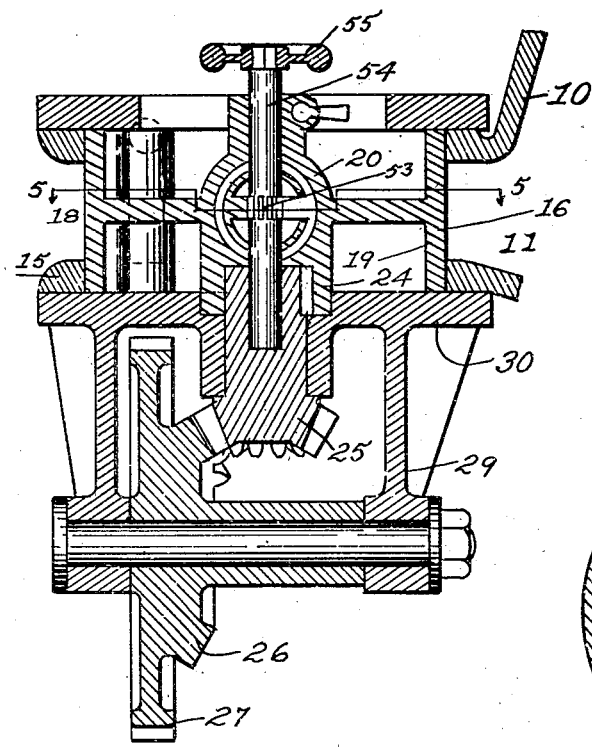
Figure 4 is a fragmentary elevation mainly in vertical section of the apparatus and machine embodying an adjustable size dough receiving or measuring pocket.
Figure 5:
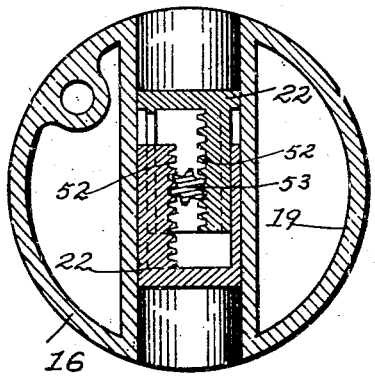
Figure 5 is a section on the line 5—5 of Figure 4.
Figure 6:
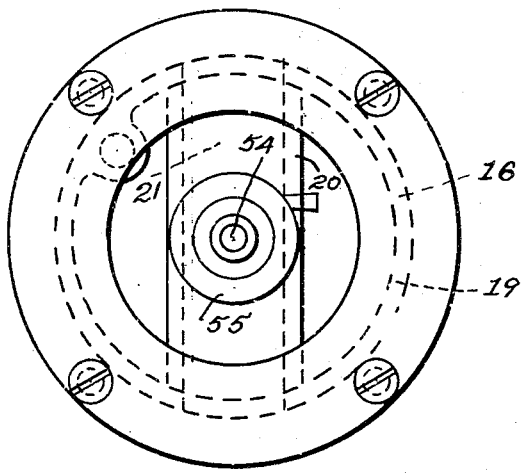
Figure 6 is a plan view of the adjustable measuring pocket of Figures 4 and 5.

Various means may be utilized for changing the weights that the machine will produce. In the form shown in Figure 1, different size pockets may be provided by substituting different size blocks for the block 22. In Figures 4 to 6, inclusive, there has been shown a slight modification of the measuring element 16 by which the same device may be utilized for producing different weights of dough, as may be desired. In Figure 4, the measuring element or member 16 has its diametric passage 21 closed in the center by two relatively movable blocks 22 which are provided with rack teeth 52 engaging a pinion 53 on a vertical adjusting shaft 54. The adjusting shaft 54 is shown as provided with an operating wheel 55. By this construction, by turning the wheels 55, the two portions of the block 22 may be moved in opposite directions, increasing or decreasing in the same amounts the sizes of the pockets at the opposite ends of the way or passage 21.

An important feature and advantage of the present process and apparatus is the ability of the process and apparatus to place what is known as a skin upon particles of dough subdivided by the machine. When the particles of dough are subdivided by the measuring chambers and ejected onto the conveyor 34, they are carried around the annular track while they are rounded to some extent and also fanned with air by the centrifuge member 10. This results in the outer surface or skin of the dough particle being slightly dried and thereby the dough particle, when it is received from the machine, may be molded or otherwise handled without the necessity of employing dusting flour.

Ordinarily in making bread or rolls, in handling the dough in molding or other operations, dusting flour is required. Not only is this dusting flour expensive but it has not been subjected to a fermenting operation and is in improper state for baking. The dusting flour added to the dough explodes in the baking operation and creates holes in the loaf.

While the particular form of process and apparatus herein described is well adapted to carry out the objects of the present invention, it is to be understood that various modifications and changes may be made in the apparatus and method of the present invention. This invention is therefore not limited to the particular method and means shown for illustrating the invention, but includes all such modifications and changes and equivalents as come within the scope of the appended claims.

I claim:

1. A machine for sub-dividing dough into particles of uniform weight which comprises, a centrifuging chamber for the dough, a measuring chamber carried by said centrifuging chamber and positioned to receive dough from said centrifuging chamber, and means for shutting off said measuring chamber from said centrifuging chamber and discharging the dough therefrom.

2. A machine for sub-dividing dough into particles of uniform weight which comprises, a centrifuging chamber and means for driving the same at constant speed, a measuring chamber carried by said centrifuging chamber and positioned to be filled with dough from the centrifuging chamber, means for disconnecting the measuring chamber from the centrifuging chamber, and means for receiving the dough from the measuring chamber.

3. A machine for sub-dividing dough which comprises, a centrifuging chamber wherein dough reaching the outer periphery of the centrifuging chamber is reduced to a substantially uniform consistency and the larger gas pockets are ruptured and a portion at least of the gas works inwardly towards the center of the centrifuging chamber, means for driving said chamber at constant speed, a measuring pocket carried by and disposed at the periphery of the centrifuging chamber for receiving a definite volume of said dough, means for cutting off said pocket from said centrifuging chamber while the dough in said centrifuging chamber is still under centrifugal pressure, whereby a uniform weight of dough is obtained in said pocket.

4. A process of treating dough which comprises, subjecting the dough to centrifugal force sufficient to reduce the dough to uniform consistency while puncturing and discharging gas from the larger gas cells of the dough.

5. A process of treating dough which comprises, applying to the dough a centrifugal force below that which crushes the dough, to where it requires re-enlivening while maintaining a sufficient body of dough undergoing centrifuging so that the dough is reduced to a substantially uniform density and the larger gas cells are punctured and a portion of the gas discharged from the dough.

6. A process of sub-dividing dough which comprises, subjecting dough to the requisite centrifugal force to reduce the dough to a substantial uniform density, then passing the dough while still under pressure sufficient to maintain substantially the same uniform density into a measuring pocket, and stopping the flow of dough to said measuring pocket when the same is filled, while still maintaining the dough in said pocket at the same apparent density.

7. An apparatus for measuring dough comprising, a centrifuge member, means for driving the same at constant speed, a plurality of measuring pockets carried by said centrifuge member and adapted to be intermittently connected to the centrifuging chamber of said centrifuge member, means for automatically operating said measuring members for presenting the measuring members to the centrifuge chamber and then disconnecting the same therefrom and permitting the material in said measuring pockets to be discharged, and a conveyor disposed to receive the material from said measuring chambers.

8. A machine for handling dough which comprises, a centrifuge chamber, means for driving the same at constant speed, a plurality of measuring chambers, means for mounting said measuring chambers on said centrifuge, means for operating said measuring chambers during the motion of said centrifuge for first connecting the measuring chambers with the centrifuge chamber and then disconnecting said chambers from said centrifuge chamber, and a revolvable conveyor around said centrifuge for receiving the measured portions of dough.

9. A machine for measuring dough comprising, a centrifuge chamber, a worm gear connected with said centrifuge chamber, a stationary worm coacting with said worm gear, measuring elements connected with said centrifuge chamber, a mutilated gear means connecting said measuring elements with said worm gear whereby the measuring elements are intermittently connected and disconnected with the centrifuge chamber of said centrifuge member.

10. An apparatus for measuring dough comprising a centrifuge member with means for revolving the same at a constant speed, a plurality of measuring pockets carried by said centrifuge member and adapted to be intermittently connected to the centrifuging chamber of said centrifuge member, and means for automatically operating said measuring members for presenting the measuring members to the centrifuge member and then disconnecting the same therefrom and permitting the material in said measuring pockets to be discharged.

11. An apparatus for measuring dough comprising a centrifuge member with means for revolving the same at a predetermined speed, a plurality of measuring pockets carried by said centrifuge member and adapted to be intermittently connected to the centrifuging chamber of said centrifuge member and disconnected therefrom, and a circular conveyor around said centrifuge member positioned to receive ejected dough particles therefrom.

12. A machine for treating dough which comprises, a centrifuging chamber in which said dough may be subjected to centrifugal force sufficient to reduce the dough reaching the outer periphery of the machine to a substantially predetermined density, means for driving the centrifuging chamber at constant speed, and means for introducing air into the dough at the periphery of the centrifuging chamber.

13. An apparatus for measuring dough comprising a centrifuging member with means for revolving the same at constant speed, a plurality of measuring pockets carried by said centrifuge chamber and revolvably mounted, to be intermittently connected to the centrifuge chamber of said centrifuge member and intermittently disconnected therefrom, and gear means connected with said measuring pockets, and a stationary gear coacting therewith so that the measuring pockets are automatically operated by the revolving of said centrifuge member.

14. An apparatus for measuring dough comprising, a centrifuging member with means for revolving the same at constant speed, a plurality of measuring pockets carried by said centrifuge chamber and revolvably mounted, to be intermittently connected to the centrifuge chamber of said centrifuge member and intermittently disconnected therefrom, gear means connected with said measuring pockets, and a stationary gear coacting therewith so that the measuring pockets are automatically operated by the revolving of said centrifuge member, said gear means including mutilated gear members.

15. An apparatus for measuring dough comprising, a centrifuge member with means for revolving the same at a constant speed, a plurality of measuring pockets carried by said centrifuge member and adapted to be intermittently connected to the centrifuging chamber of said centrifuge member, means for automatically operating said measuring pockets for presenting the measuring pockets to the centrifuge member and disconnecting the same therefrom and permitting the material in said measuring pockets to be discharged and an annular conveyor surrounding the measuring pockets in position to receive the dough therefrom.

16. An apparatus for measuring dough comprising, a centrifuge member with means for revolving the same at a constant speed, a plurality of measuring pockets carried by said centrifuge member and adapted to be intermittently connected to the centrifuging chamber of said centrifuge member, means for automatically operating said measuring pockets for presenting the measuring pockets to the centrifuge member and disconnecting the same therefrom and permitting the material in said measuring pockets to be discharged, an annular conveyor surrounding the measuring pockets in position to receive the dough therefrom, and a stationary member cooperating with the annular conveyor for rounding the dough particles and provided with a discharge opening.

17. An apparatus for measuring dough comprising, a centrifuge member with means for revolving the same at a constant speed, a plurality of measuring pockets carried by said centrifuge member and adapted to be intermittently connected to the centrifuging chamber of said centrifuge member, means for automatically operating said measuring pockets for presenting the measuring pockets to the centrifuge member and disconnecting the same therefrom and permitting the material in said measuring pockets to be discharged, an annular conveyor surrounding the measuring pockets in position to receive the dough therefrom, and means for driving said annular conveyor at relatively low speed compared with the speed of said centrifuging chamber.

18. A process of treating dough which comprises subjecting the dough to centrifugal force sufficient to reduce the dough to uniform density while puncturing and discharging gas from the larger gas cells of the dough, and introducing air into the periphery of the mass of dough being centrifuged so that the same may work through the dough.

19. A machine for sub-dividing dough into particles of uniform weight, which comprises a centrifuging chamber for the dough having a lateral discharge port, a measuring chamber carried by said centrifuging chamber and rotatable relative to said centrifuging chamber from a loading position wherein it receives dough from the discharge port of said centrifuging chamber to a discharging position wherein it shuts off the lateral port of the centrifuging chamber, and means for intermittently rotating said measuring chamber to the loading position and to the discharging position during the revolutions of said centrifuging chamber.

20. A machine for sub-dividing dough into particles of uniform weight, which comprises a centrifuging chamber for the dough having a lateral discharge port, a measuring chamber carried by said centrifuging chamber and rotatable relative to said centrifuging chamber from a loading position wherein it receives dough from the discharge port of said centrifuging chamber to a discharging position wherein it shuts off the lateral port of the centrifuging chamber, means for intermittently rotating said measuring chamber to the loading position and to the discharging position during the revolutions of said centrifuging chamber, and means for varying the volumetric capacity of said measuring chamber.

21. A machine for sub-dividing dough into particles of uniform weight, which comprises a centrifuging chamber for the dough having a lateral discharge port, a measuring chamber carried by said centrifuging chamber and rotatable relative to said centrifuging chamber from a loading position wherein it receives dough from the discharge port of said centrifuging chamber to a discharging position wherein it shuts off the lateral port of the centrifuging chamber, and means for intermittently rotating said measuring chamber to the loading position and to the discharging position during the revolutions of said centrifuging chamber, said measuring chamber having relatively movable members adapted to vary the volumetric capacity of said measuring chamber.

22. A machine for sub-dividing dough into particles of uniform weight, which comprises a centrifuging chamber for the dough, a plurality of measuring chambers carried by said centrifuging chamber and positioned to receive dough from said centrifuging chamber, and means for shutting off said measuring chambers from said centrifuging chamber and discharging the dough therefrom, said means including means for shutting off the different measuring chambers from the centrifuging chamber at different times, whereby all of the measuring chambers are not unloaded at the same time.

23. An apparatus for measuring dough, comprising a centrifuging member with means for revolving the same at a constant speed, a plurality of measuring pockets carried by said centrifuge member and adapted to be rotated intermittently to connect with the centrifuging chamber of said centrifuge member, and means for automatically operating said measuring pockets for presenting the measuring pockets to the centrifuge member and then disconnecting the same therefrom and permitting the material in said measuring pockets to be discharged, said means including means for causing different measuring pockets to be disconnected from the centrifuge member at different periods of operation.

Signed at Los Angeles, California, this 10th day of May, 1929.

JAMES GARVEY.